US008639123B2

(12) United States Patent
Claisse et al.

(10) Patent No.: US 8,639,123 B2
(45) Date of Patent: Jan. 28, 2014

(54) FLEXIBLE DISPERSION MAPPING

(75) Inventors: Paul Robert Claisse, Freehold, NJ (US); Rene'-Jean Essiambre, Red Bank, NJ (US)

(73) Assignee: Alcatel Lucent, Paris (FR)

( * ) Notice: Subject to any disclaimer, the term of this patent is extended or adjusted under 35 U.S.C. 154(b) by 198 days.

(21) Appl. No.: 13/108,048

(22) Filed: May 16, 2011

(65) Prior Publication Data

US 2011/0211828 A1 Sep. 1, 2011

Related U.S. Application Data

(62) Division of application No. 11/522,785, filed on Sep. 15, 2006, now Pat. No. 7,965,945.

(51) Int. Cl.
*H04B 10/12* (2011.01)

(52) U.S. Cl.
USPC .......................... 398/147; 398/158; 398/159

(58) Field of Classification Search
USPC .......................... 398/147–148, 150, 158–159
See application file for complete search history.

(56) References Cited

U.S. PATENT DOCUMENTS

| | | | |
|---|---|---|---|
| 6,311,002 B1 | 10/2001 | Evangelides et al. | |
| 6,583,907 B1 | 6/2003 | Essiambre | |
| 6,606,176 B1 | 8/2003 | Essiambre et al. | |
| 6,788,833 B1 | 9/2004 | Brisson et al. | |
| 6,792,214 B1 | 9/2004 | Essiambre et al. | |
| 7,027,740 B2 | 4/2006 | Essiambre | |
| 7,184,410 B1* | 2/2007 | Frankel et al. | ............... 370/252 |
| 7,280,765 B2 | 10/2007 | Chowdhury et al. | |
| 7,379,647 B2 | 5/2008 | Claisse et al. | |
| 2004/0234272 A1* | 11/2004 | Chowdhury et al. | ......... 398/147 |
| 2005/0244164 A1* | 11/2005 | Miyashita et al. | ............ 398/147 |
| 2006/0045541 A1 | 3/2006 | Chowdhury et al. | |
| 2007/0183711 A1* | 8/2007 | Abbott et al. | ................... 385/24 |

OTHER PUBLICATIONS

Presentation entitled "Engineering Rule Enhancements for EON R8.3" to Verizon by J. Ballantine in Jul. 2003, 13 pages.
"Dispersion (optics)", From Wikipedia, the free encyclopedia, http://en.wikipedia.org/wiki/Dispersion (optics), 7 pgs, Apr. 2010.

* cited by examiner

*Primary Examiner* — Dzung Tran
(74) *Attorney, Agent, or Firm* — Mendelsohn, Drucker & Dunleavy, P.C.; Yuri A. Gruzdkov; Steve Mendelsohn

(57) ABSTRACT

One method configures an all-optical network such that at least eighty percent of optical fiber spans of a portion of a first all-optical path of the network have substantially a first residual dispersion per span and at least eighty percent of optical fiber spans of a remainder of the first all-optical path have residual dispersions per span substantially differing from the first residual dispersion per span. The remainder of the first all-optical path includes an overlap between the first all-optical path and a second all-optical path of the network. The second all-optical path has a plurality of optical fiber spans and a substantially singly periodic dispersion map.

10 Claims, 7 Drawing Sheets

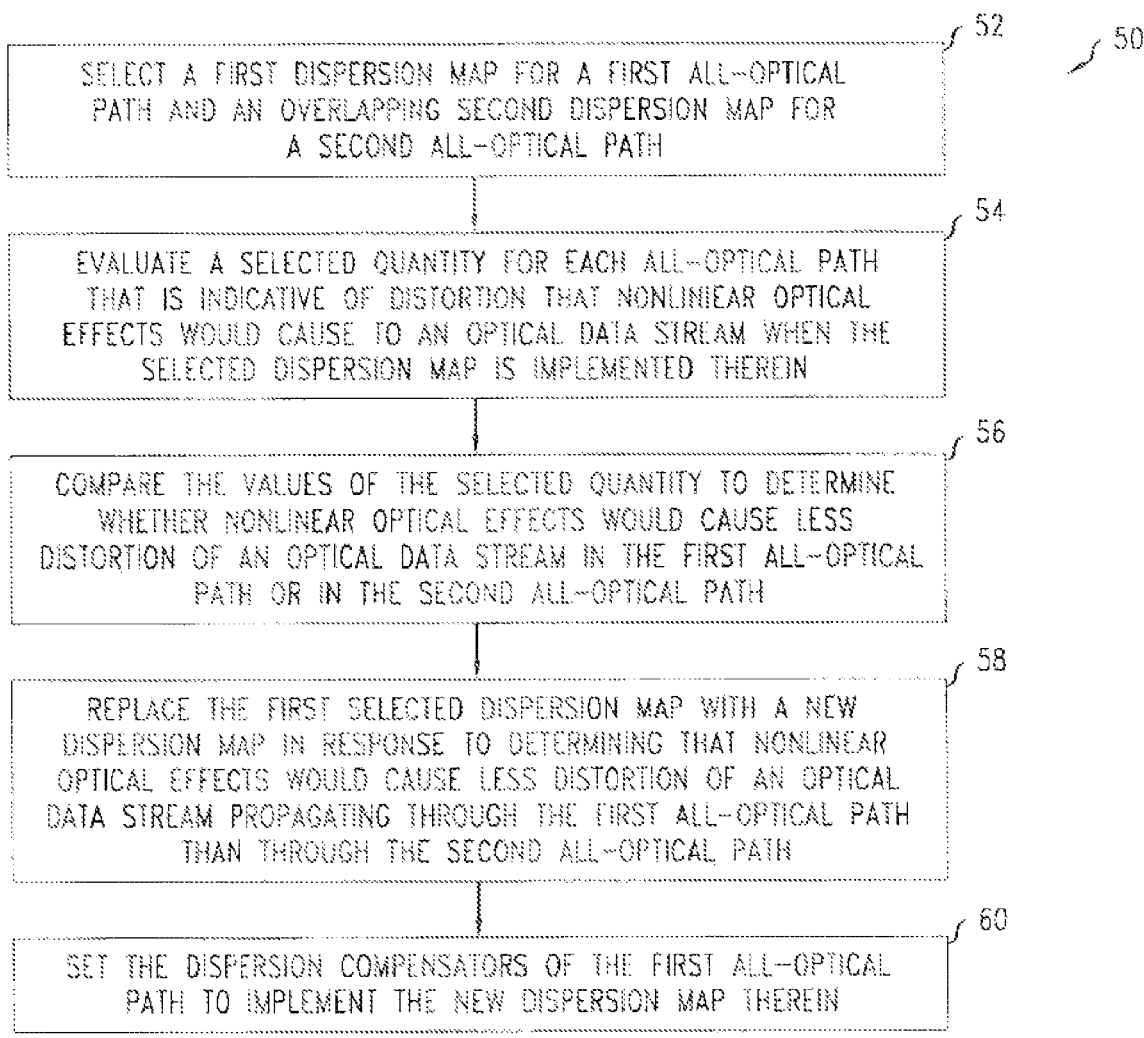

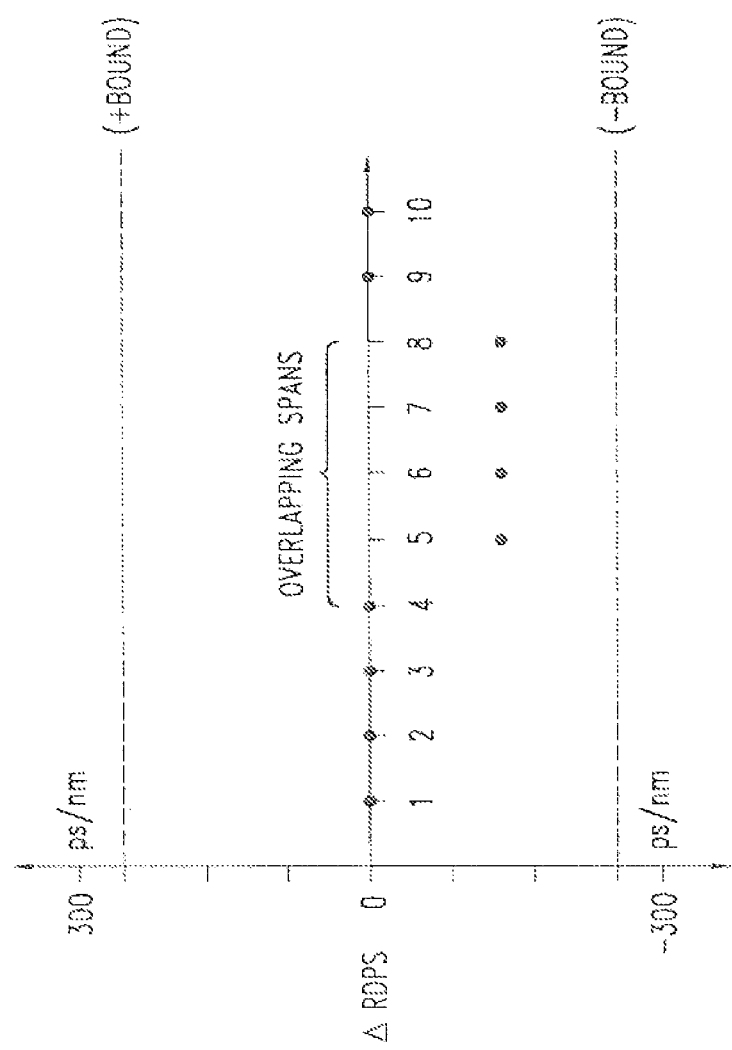

FLEXIBLE DISPERSION MAPPING

This is a divisional of patent application Ser. No. 11/522,785, filed Sep. 15, 2006 now U.S. Pat. No. 7,965,945.

BACKGROUND

1. Field of the Invention

The invention relates to optical fiber lines and networks and to methods of designing and making such networks and lines.

2. Discussion of the Related Art

This section introduces aspects that may be helpful, to facilitating a better understanding of the inventions. Accordingly, the statements of this section are to be read in this light. The statements of this section are not to be understood as admissions about what is in the prior art or what is not in the prior art.

In optical fiber communications systems, non linear optical effects can distort streams of optical signals or pulses in a manner that increases the bit-error-rates (BERs) associated with demodulating data from said streams in optical receivers. To reduce such distortions of optical data streams, some optical fiber transmission systems actively manage the cumulative dispersion of the optical pulses or signals along the optical fiber transmission line therein. To produce such active dispersion management, the individual optical fiber spans of the line are typically constructed with an optical dispersion compensator at one end thereof. The optical dispersion compensator resets the cumulative dispersions of received optical signals or pulses so that the cumulative dispersions evolve along a preselected dispersion map in the optical fiber transmission line. For a proper dispersion map, such dispersion management can significantly reduce the accumulation of the unwanted distortions that nonlinear optical effects produce. In turn, this reduction can lower BERs in the optical receiver and/or increase the maximum length obtainable for the optical fiber transmission line.

In some fiber optical communications systems, different point-to-point optical paths share optical fiber spans therein. For example, an optical fiber communication system with a ring topology and more than two nodes may include optical paths with overlapping or shared optical fiber spans.

BRIEF SUMMARY

In one aspect, a first method includes evaluating a quantity indicative of a distortion that nonlinear optical effects will cause to a stream of optical signals propagating through an all-optical path in response to the all-optical path being configured with a first dispersion map. The all-optical path has a series of consecutive optical fiber spans. The method also includes selecting a second dispersion map that assigns to a plurality of the optical fiber spans substantially different residual dispersions per span than the first dispersion map and that assigns to spans near the ends of the path substantially the residual dispersions per span of the first dispersion map. The selecting step is performed in response to the evaluated quantity indicating that the distortion will be smaller than a selected threshold.

In some embodiments, the first method includes setting a plurality of in-line dispersion compensators of the all-optical path such that the all-optical path is configured with the second dispersion map thereon.

In some embodiments of the first method, the above-described quantity is representative of the total nonlinear phase shift of the all-optical path, e.g., total per channel nonlinear phase shift of the all-optical path.

In some embodiments of the first method, the first dispersion map is a substantially singly periodic dispersion map. In such embodiments, the plurality of the spans may include forty percent or more of the spans of the all-optical path.

In some embodiments of the first method, the second dispersion map assigns residual dispersions per span to eighty percent or more of the spans that differ by less than 500 picoseconds per nanometer from the corresponding residual dispersions per span assigned thereto by the first dispersion map.

In some embodiments of the first method, the path has eight or more optical fiber spans or even twelve or more of the spans and the plurality of the spans may include forty percent or more of the spans of the all-optical path.

In some embodiments, the first method also includes evaluating a quantity indicative of a distortion that nonlinear optical effects will cause to a stream of optical signals propagating through a second all-optical path in response to the second all-optical path being configured with a third dispersion map. The two all-optical paths overlap over a sequence of consecutive optical fiber spans. Then, the step of selecting a second dispersion map is performed in response to the evaluated quantities indicating that a higher distortion will be caused in the second optical path than in the first optical path if the first optical path is configured with the first dispersion map and the second optical path is configured with the third dispersion map. In some such embodiments, the first and third dispersion maps may be substantially singly periodic dispersion maps that assign substantially different residual dispersions per span to the overlapping optical fiber spans.

In another aspect, a second method includes configuring an all-optical network such that at least eighty percent of optical fiber spans of a portion of a first all-optical path of the all-optical network have substantially a first residual dispersion per span and at least eighty percent of optical fiber spans of a remainder of the first all-optical path have residual dispersions per span substantially differing from the first residual dispersion per span. The remainder of the first all-optical path includes an overlap between the first all-optical path and a second all-optical path of the all-optical network. The second all-optical path has a plurality of optical fiber spans and a substantially singly periodic dispersion map.

In one specific embodiment of the second method, each of the first and second all-optical paths includes eight or more optical fiber spans or may even include twelve or more optical fiber spans.

In the one specific embodiment of the second method, ninety percent or more of the optical fiber spans in the remainder of the first all-optical path may have a residual dispersion per span that substantially differs from the first residual dispersion per span. Also, ninety percent or more of the optical fiber spans of the portion of the first all-optical path may have substantially the first residual dispersion per span.

In the brie specific embodiment of the second method, ninety percent or more of the optical fiber spans of the first all-optical path may have residual dispersions per span that differ by less than about 500 picoseconds per nanometer.

In the one specific embodiment of the second method, the overlap between the all-optical paths may include forty percent or more of the optical fiber spans of the first all-optical path.

In the one specific embodiment of the second method, eighty percent or more of the optical fiber spans of the remainder of the first all-optical path may have substantially a second residual dispersion per span.

In the one specific embodiment of the second method, eighty percent of the optical fiber spans of the second all-optical path may have substantially the second residual dispersion per span.

In the one specific embodiment of the second method, ninety percent or more of the optical fiber spans of the remainder of the first all-optical path and ninety percent or more of the optical fiber spans of the second all-optical fiber-based path may have substantially the second residual dispersion per span. The overlap between the all-optical paths may include forty percent or more of the optical fiber spans of both the first and the second all-optical paths.

BRIEF DESCRIPTION OF THE DRAWINGS

FIG. 5 is allow chart illustrating a method for designing and setting up dispersion maps in two all-optical fiber-based paths with an overlapping segment; and FIG. 6 plots the difference between the residual dispersion per span of an exemplary all-optical path when configured with a dispersion map produced by the method of FIG. 4 and when configured with another dispersion map, e.g., a substantially optimal dispersion map for that all-optical path.

In the Figures and text, like reference numerals indicate elements with similar functions.

In the Figures, the relative dimensions of some features may be exaggerated to more clearly illustrate one or more of the structures therein.

Herein, various embodiments are described more fully by the Figures and the Detailed Description of Illustrative Embodiments. Nevertheless, the inventions may be embodied in various forms and are not limited to the embodiments described in the Figures and Detailed Description of Illustrative Embodiments.

DETAILED DESCRIPTION OF ILLUSTRATIVE EMBODIMENTS

Active dispersion maps and/or methods for implementing dispersion maps may be described in one or more of U.S. Pat. Nos. 6,583,907; 6,606,176; 6,788,833; 6,792,214; and 7,027, 740; and/or in one or more of U.S. patent application Ser. No. 10/152,645, filed May 21, 2002 by R.-J. Essiambre et al; U.S. patent application Ser. No. 11/239,175 filed Sep. 29, 2005 by R.-J. Essiambre et al; U.S. patent application Ser. No. 10/932, 980 filed Sep. 2, 2004 by R.-J. Essiambre et al; and U.S. patent application Ser. No. 10/729,153 filed Dec. 5, 2003 by R.-J. Essiambre et al. Each of the above-listed U.S. patents and U.S. patent applications is incorporated herein by reference in its entirety. Various embodiments described below may incorporate or use one or more of the described designs for active dispersion maps and/or incorporate one or more of the described methods for implementing dispersion mapping.

In some optical fiber communications systems, it may be difficult or expensive to design a dispersion map that optimally reduces the distortions of optical signals and pulses, which are generated by nonlinear optical effects. For example, conflicts to optimally managing the dispersions of different optical data streams may arise due to a nontrivial topology in an optical fiber-based network. Indeed, such conflicts may occur in several types of optical fiber communications systems as illustrated by the following examples.

As a first example, an optical fiber communications system may include an all-optical fiber-based network. Herein, an all-optical fiber-based network is an optical network that has a plurality of all-optical fiber-based paths. Each all-optical fiber-based path is defined by a sequence of optical fiber spans. In an all-optical fiber-based network, at least, two of the all-optical fiber-based paths have an overlap over one or more of the optical fiber spans.

Figure 1A:
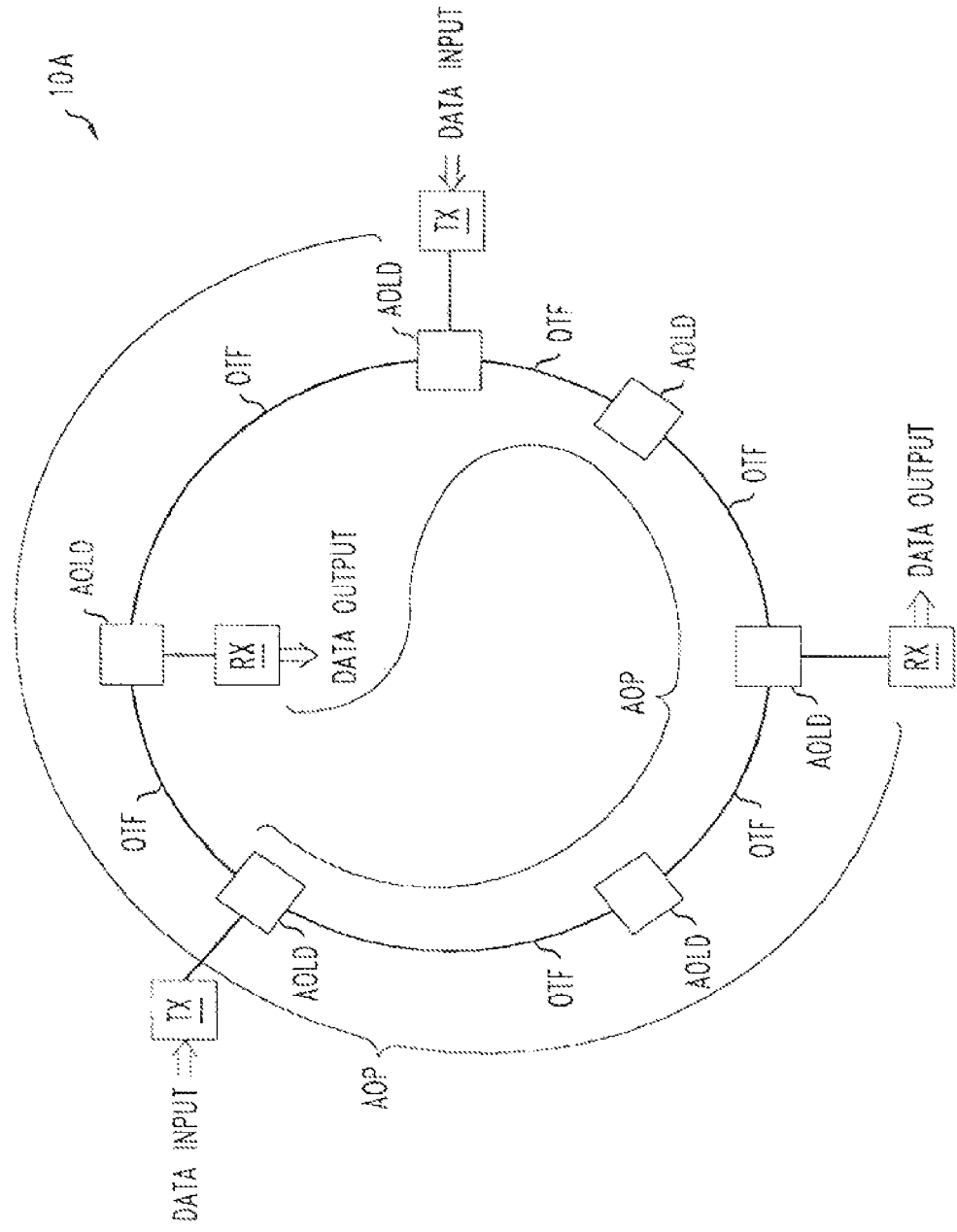
FIG. 1A is a block diagram illustrating an exemplary ring optical fiber network in which two all-optical fiber-based paths have overlapping optical fiber spans.
Figure 1B:
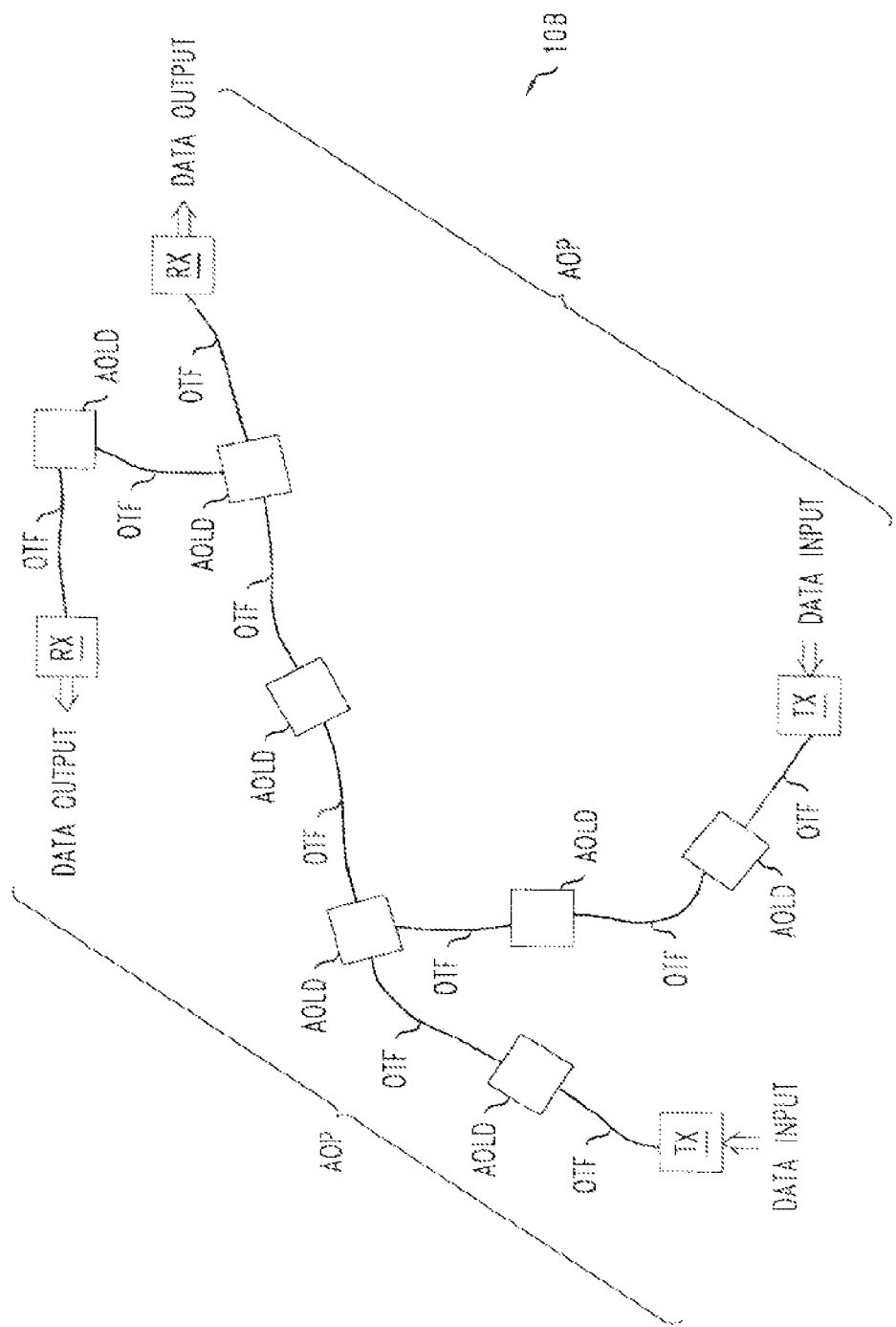
FIG. 1B is a block diagram illustrating a portion of an optical fiber network in which two all-optical fiber-based paths share a sequence of optical fiber spans.

FIGS. 1A-1B show exemplary all-optical fiber-based networks 10A, 10B in which all-optical paths (AOPs) connect an optical transmitter (TX) to an optical receiver (RX) via sequences of optical fiber spans. Herein, an optical fiber span includes a conventional optical-transmission fiber, OTF, and an all-optical lumped device (AOLD). The all-optical lumped device, AOLD, connects the optical transmission fiber, OTF, of the optical fiber span to one or more neighboring optical fiber spans, e.g., connects the second end of the optical fiber span to the next such span. The all-optical lumped device, AOLD, may include conventional in-line optical amplifiers, in-line optical dispersion compensators, an optical add/drop multiplexer (OADM) and/or an optical cross-connect (OXC). Notably, the all-optical fiber-based paths of the all-optical fiber-based networks 10A, 10B also have overlaps over one or more of the optical fiber spans therein.

In all-optical fiber-based networks e.g., the networks 10A-10B, overlaps between different optical fiber spans can interfere with the optimal management of cumulative dispersions in each of the individual all-optical paths therein. For example, two optical paths may have different start points and/or different end points that cause optical signals or pulses therein to have different cumulative dispersions in the overlap between the two optical paths. That is, the cumulative dispersions of such optical signals or pulses may depend on which optical fiber-based path the optical signals or pulses are following. For that reason, it may be impossible to optimally manage the cumulative dispersions of the optical signals or pulses of both all-optical fiber-based paths in the overlap between the two optical fiber-based paths.

Second, an optical fiber communications system may use wavelength division multiplexed (WDM) technology. WDM technology often causes optical signals or pulses on different wavelength-channels to take different optical paths. For example, WDM all-optical fiber-based networks often include one or more OADMs and/or one or more OXCs that add/drop selected wavelength-channels. Due to the different associated optical paths of the various wavelength channels, a conflict may arise in the optimal management of the cumulative dispersions of the optical signals or pulses on the different wavelength-channels.

In the above-described optical fiber communications systems, it may be desirable to manage cumulative dispersions on one or more of their individual all-optical fiber-based paths in a suboptimal manner. Then, optical receivers of optical data streams from said all-optical fiber-based paths may be subject to suboptimal bit error rates (BERs), which are still however, acceptable. For that reason, active dispersion management may be based on a more flexible dispersion mapping scheme. In some all-optical fiber-based paths, some flexible dispersion mapping schemes have enabled substantial departures from optimal dispersion maps all-optical fiber-based paths without the production of unacceptable distortions of optical dab streams by nonlinear optical effects. Below, other flexible dispersion mapping schemes are described. These other flexible dispersion mapping schemes produce substantial departures from optimal dispersion maps at interiors of all-optical fiber-based paths, i.e., away from the ends of the all-optical fiber-based paths. The new flexible dispersion mapping schemes may be useful for constructing nontrivial all-optical fiber based networks in which nonlinear optical effects do not cause undesirably large BERs in any optical data steams propagating there through.

FIGS. 1A and 1B schematically illustrate portions of exemplary all-optical fiber-based networks 10A, 10B that may have dispersion maps designed according to one or more of the methods described below.

Figure 2:
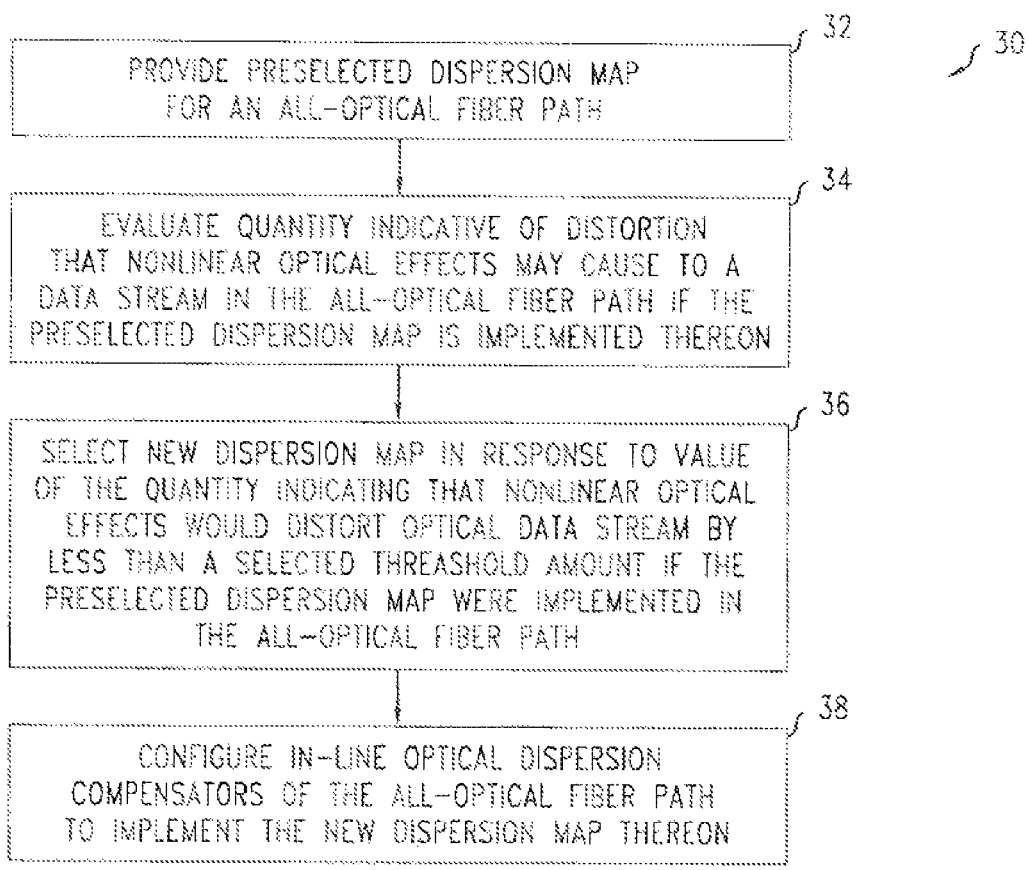
FIG. 2 is a flow chart illustrating a method that flexibly designs dispersion maps for an all-optical fiber-based path of an optical fiber communications system.

FIG. 2 illustrates a method 30 for flexibly designing dispersion maps for an all-optical fiber-based communications system, e.g., the all-optical fiber-based networks 10A, 10B of FIGS. 1A-1B. The all-optical fiber-based communications system includes one or more all-optical fiber-based paths. In embodiments with more than one all-optical fiber-based path, the different all-optical fiber-based paths may overlap along optical fiber segments therein, e.g., as in the all-optical fiber-based paths of FIGS. 1A and 1B, or may not overlap at all.

The method 30 includes providing a preselected dispersion map for one all-optical fiber-based path of the all-optical fiber-based communications system (step 32). The all-optical fiber-based, path may be, e.g., a long path with eight or more optical fiber spans, twelve or more optical fiber spans, or many more optical fiber spans. The preselected dispersion map may be, e.g., a singly periodic dispersion map in which residual dispersions per span (RDPSs) have substantially the same value or may be, e.g., a doubly periodic dispersion map in which the residual dispersions per span have one of two values. Alternatively, the preselected dispersion map may be a substantially singly periodic dispersion map or a substantially doubly periodic map. Herein, a substantially singly [doubly] periodic dispersion map is a dispersion map for which 80 percent or more of the optical fiber spans and preferably 90 percent or more of the spans fiber spans have substantially RDPSs of a specific singly [doubly] periodic dispersion map. The preselected dispersion map may be selected, e.g., so that nonlinear optical effects will minimally distort optical pulses or signals transmitted through the length of the all-optical fiber-based path. The amount of distortion of the optical data-stream may be defined by the BER in an optical receiver demodulating an optical data stream that has been transmitted through and received from the all-optical fiber-based path. Preferably, the preselected dispersion map ensures that said demodulation of optically transmitted data produces an acceptably low BER. Typically, acceptably low BERs are less than $10^{-3}$ errors per second(/s) and more preferably are less than about $10^{-7}$ errors per second or less.

Herein, an optical fiber span has substantially a specific RDPS if the actual RDPS of the span differs from the particular. RDPS by less than about 3/2 times a typical error commercially available dispersion compensators. For example, a contemporary commercially available dispersion compensator often has an error of about −85 ps/nm.

Herein, the residual dispersion per span (RDPS) of an optical fiber span of an all-optical fiber-based path is the change in cumulative dispersion that an optical pulse or signal acquires as the optical pulse or signal propagates through the optical fiber span.

Herein, an optical fiber span includes an optical transmission fiber and any lumped all-optical device that connects the optical transmission fiber to a later optical fiber-span along the same all-optical fiber-based path.

At step 32, the preselected dispersion map determines the residual dispersion per span for each optical fiber span of the all-optical fiber-based path and also determines any dispersion pre-compensation and any dispersion post-compensation at the first and second ends of the all-optical fiber-based path. Thus, the preselected dispersion map will fix, e.g., the settings of in-line dispersion compensators that are located between each optical transmission fiber of the all-optical fiber-based path.

Next, method 30 includes evaluating a selected quantity whose value is indicative of the amount of distortion that nonlinear optical effects would cause to a data stream of optical pulses or signals in the all-optical fiber-based path if the preselected dispersion map were implemented thereon (step 34). The selected quantity may be e.g., proportional the magnitude of the total per-channel nonlinear phase shift, $\phi_{NL}$, that would be produced by nonlinear optical effects on an optical pulse or signal that travels from one end of the all-optical fiber-based path to the other end. Along one optical fiber span "j", the per-channel nonlinear phase shift, $\phi^j_{NL}$, is approximately given by $\phi^j_{NL}=\int_0^{L_j} \gamma_j P_j(z)dz$ where $P_j(z)$ is the time-averaged optical power at point "z" in the optical transmission fiber of the optical fiber span "j" and $\gamma_j$ is a nonlinear optical coefficient for the optical fiber span "j", e.g., of the optical transmission fiber of the span. Over an ail-optical fiber-based path; which has N optical fiber spans, the total per-channel nonlinear phase shift, $\phi_{NL}$ is defined by:

$$\phi_{NL} = \sum_{j=1}^{N} \phi^j_{NL}.$$

Other embodiments may use another physically measurable quantity for the selected quantity whose value is indicative of the amount or distortion that nonlinear optical effects would cause to a data stream of optical pulses or signals traveling through the all-optical fiber-based path.

A total per-channel nonlinear phase shift, $\phi_{NL}$, of less than about 90 percent or about 80 percent of the value which indicates an unacceptably high distortion due to nonlinear optical effects would imply that there is still substantial flexibility in the dispersion map of the all-optical fiber-based path. Here, unacceptably high distortions would typically cause BERs of $10^{-7}$/s or more and may in some embodiments even cause BERs of $10^{-3}$/s or more in an optical data demodulator couple to the second end of the all-optical fiber-based path. For acceptably low values of the total per-channel nonlinear phase shift, $\phi_{NL}$, as described above, the flexibility that typically remains in the form of the dispersion map can be usefully exploited.

For that reason, the method 30 includes selecting a new dispersion map in response to the value of the selected quantity indicating that nonlinear optical effects may or would distort an optical data stream in the all-optical fiber-based path by less than a selected threshold amount when the preselected dispersion map is implemented therein (step 36). The selected threshold amount may be, e.g., 90 percent of the magnitude of the total per-channel nonlinear phase shift that indicates an acceptably low BER during data demodulation at the receiver or 80 percent of the same magnitude. The selected threshold may also be the largest magnitude of the selected quantity over other all-optical fiber-based paths of an all-optical network, wherein a portion of each of the other all-optical fiber-based paths overlaps the all-optical fiber-based path of step 32. The all-optical fiber-based path of step 32 may cause more nonlinear optical distortion of an optical data stream when configured with the new dispersion map than when configured with the preselected dispersion map of step 32. The new dispersion map assigns one or more RDPSs to one or more of the optical fiber spans of the all-optical fiber-based path of step 32, wherein the one or more RDPSs substantially differ from the RDPSs assigned to the same optical fiber spans by the preselected dispersion map. The new dispersion map assigns substantially the same RDPSs to the optical fiber spans located near the ends of the all-optical fiber-based path of step 32 as the preselected dispersion map.

In particular, the new dispersion map deforms the preselected dispersion map in a manner that does not change the assignments of RDPSs so that the magnitudes of the RDPSs are peaked at either end of the all-optical fiber-based path. Furthermore, the RDPSs of the new dispersion map will differ from the corresponding RDPSs of the preselected dispersion map by less than a fixed bound. If the preselected dispersion map is a substantially singly or doubly periodic dispersion map and the total per-channel nonlinear phase shift, $\phi_{NL}$, is greater than about 10 percent of the value that would cause an unacceptably low BER during data demodulation at the receiver or is greater than about 20 percent of the value that would cause an unacceptably low BER during data demodulation at the receiver, the fixed bound may be about 500 picoseconds per nanometer (ps/nm) or may be about 300 ps/nm.

The method 30 may also include configuring one or more of the in-line optical dispersion compensators of the all-optical fiber-based path to implement the new dispersion map therein (step 38). The step of configuring may include setting dispersion compensators at the ends of intermediate optical fiber spans to produce the RDPSs assigned by the new dispersion map or simply updating or adjusting said dispersion compensators to obtain the same effect.

Figure 3:
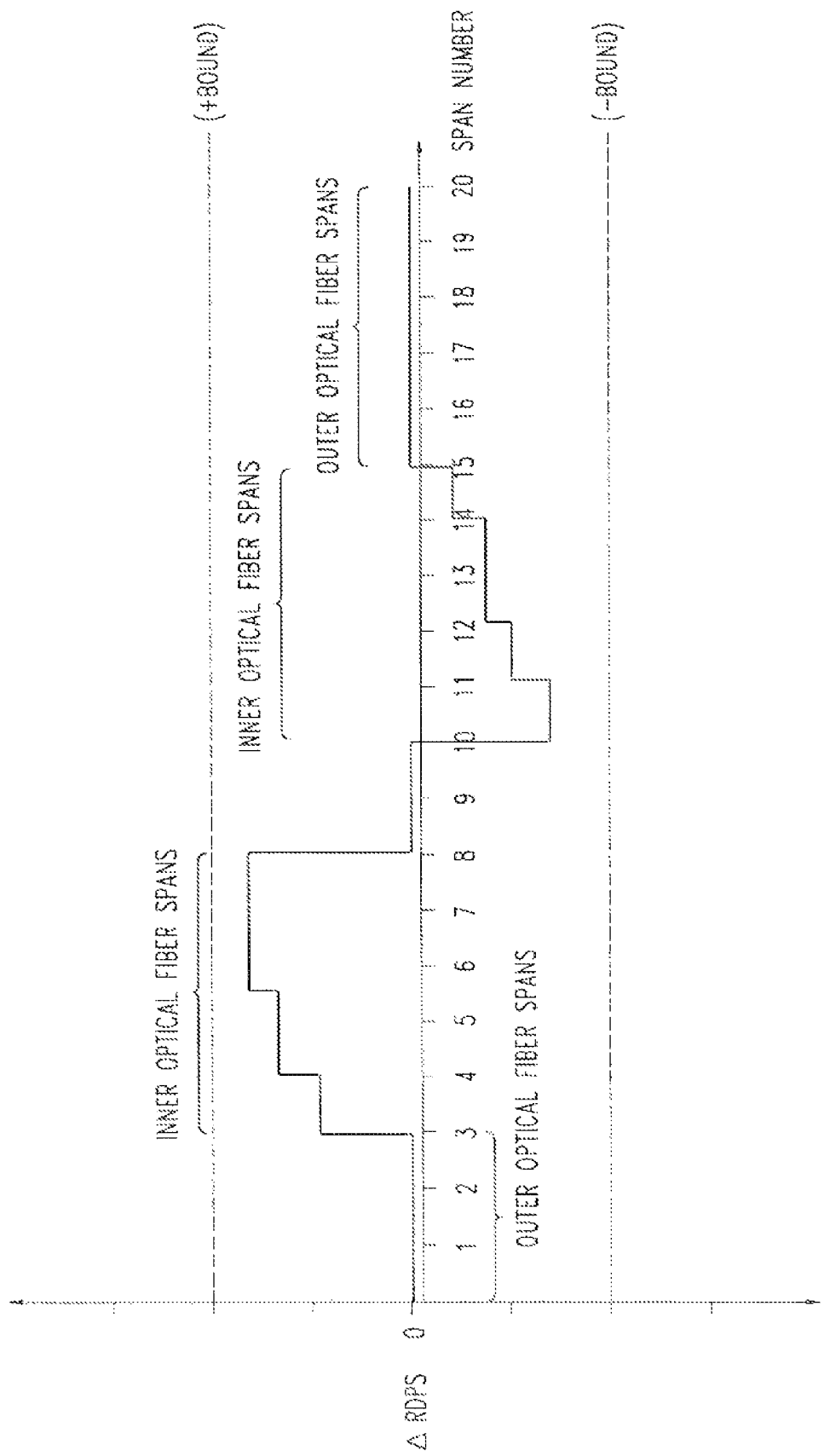
FIG. 3 schematically plots differences between residual dispersion per span of an exemplary all-optical fiber-based path when configured with a dispersion map designed by the method of FIG. 2 and when configured with a dispersion map that is substantially optimal.

FIG. 3 illustrates how RDPSs for the new and preselected dispersion maps of the method 30 may vary along one exemplary all-optical fiber-based path. In FIG. 3, the thick solid line plots a difference, $\Delta$RDPS, which is equal to the RDPS assigned by the new dispersion map minus the RDPS assigned by the preselected dispersion map. In different-embodiments, the specific form of $\Delta$RDPS may differ, but $\Delta$RDPS will still have a general form in which it is substantially nonzero values at a plurality of interior optical fiber spans. At these interior optical fiber spans, the magnitude of $\Delta$RDPS will be, e.g., less than the fixed value of 500 ps/nm and even may be limited to being less than the fixed value of 300 ps/nm. The all-optical fiber-based path also includes outer optical fiber spans, which are located near the ends of the all-optical fiber-based path, e.g., the spans on the sides of the one or more interior optical fiber spans. In these outer optical fiber spans, the magnitude of the "$\Delta$RDPS" will typically be very small or vanishing, e.g., smaller than twice the typical error in commercially available dispersion compensators.

The inventors believe that the method 30 may be useful to design and implement new dispersion maps for many all-optical fiber-based paths with large numbers of optical fiber spans. For example, the all-optical fiber-based path may have eight or more, twelve or more, or even many more optical fiber spans. For such all-optical fiber-based paths, it is believed that the new dispersion maps of the method 30 will often remain useful if they are modified by substantially changing assigned RDPSs of a few optical fiber spans, e.g., less than 20 percent of the optical fiber spans or less than 10 percent of the optical fiber spans. The new dispersion maps, which are produced by the method 30, are believed to be often advantageous when the new and preselected dispersion maps assigns substantially different RDPSs to a big percentage of the optical fiber spans of the all-optical fiber-based path. For example, these two dispersion maps may make substantially different RDPS assignments to more than 40 percent of the optical fiber spans or even to 50 or more percent of the optical fiber spans of an all-optical fiber-based path. Some embodiments of the method 30 are intended to cover methods of designing and/or configuring all-optical fiber-based paths based on new and preselected dispersion maps as described in this paragraph.

Figure 4:
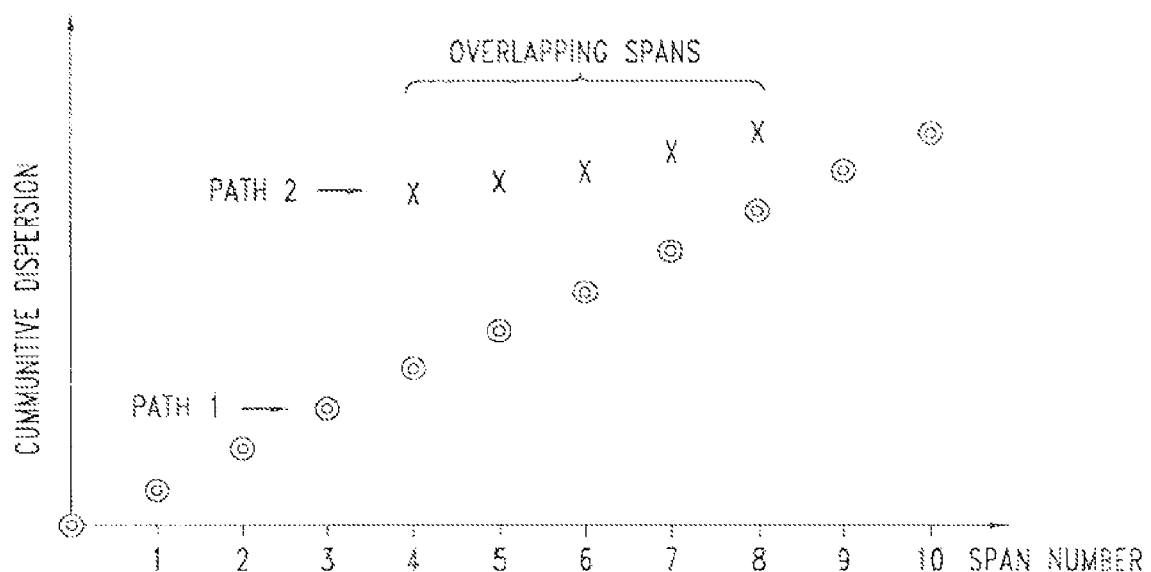
FIG. 4 schematically plots residual dispersions per span along portions of two all-optical paths that implement different dispersion maps and have an overlap with a plurality of optical fiber spans.

In an all-optical network, assigning preselected dispersion maps to the various all-optical fiber-based paths therein may produce conflicts. An example of such a conflict is illustrated in FIG. 4. FIG. 4 plots cumulative dispersions of optical pulses in first and second all-optical fiber-based paths that are configured according to separate preselected dispersion maps. With respect to the first all-optical fiber-based path, each circled point shows the cumulative dispersion of optical pulses or signals at the outputs of dispersion compensators located at ends of the optical fiber spans therein. The dispersion map of the first all-optical fiber-based path is singly periodic. With respect to the second all-optical fiber-based path, the crosses show cumulative dispersions of optical pulses at the outputs of dispersion compensators located at ends of optical fiber spans therein. For the second all-optical path, the cumulative dispersions are only shown for optical fiber spans 4-8 where the two all-optical fiber-based paths overlap. Along these optical fiber spans, the second all-optical fiber-based path also has a singly periodic dispersion map. The entire dispersion map of the second all-optical fiber-based path may or may not be singly periodic.

In FIG. 4, the first and second all-optical fiber-based paths overlap along optical fiber spans 4-8. The cumulative dispersions of the propagating optical pulses change at different rates in the overlap. The different rates are due to the different dispersion maps for the respective first and second all-optical fiber-based paths. The first and second dispersion maps differ, because optimally compensating for nonlinear optical effects imposes different requirements on the first and second all-optical fiber-based paths. Due to the different rates of change of cumulative dispersions, there is a conflict with implementing the first and second dispersion maps in the overlap. In particular, the two dispersion maps require different values of the residual dispersions per span in the optical fiber spans of the overlap. In such situations, the method 30 of FIG. 2 may provide a new dispersion map that both adequately controls nonlinear optical effects and resolves such conflicts between such all-optical fiber-based paths.

FIG. 5 illustrates a method 50 for configuring active dispersion mapping for two all-optical fiber-based paths that overlap on one or more optical fiber spans, e.g., according to the method 30 of FIG. 3. Each of the all-optical fiber-based paths may include all of or only part of the optical fiber spans that connect an optical-transmitter to an optical, receiver. Each of the all-optical fiber-based paths may or may not be, e.g., a long path, i.e., a path having, at least, eight optical fiber spans, twelve or more optical fiber spans, or many more of the optical fiber spans. The configuring may involve constructing or modifying one or both of the all-optical fiber paths, e.g., by adjusting input optical powers, pump optical powers, or dispersion compensators in a plurality of the optical fiber spans thereof.

The method 50 includes selecting a first dispersion map for the first all-optical fiber-based path and a second dispersion map for the second all-optical fiber-based path, wherein the first and second all-optical fiber-based paths overlap over one or more optical fiber spans (step 52). For each all-optical fiber-based path, the selected dispersion map may, e.g., optimally reduce the accumulation of distortions that nonlinear optical effects will cause to an optical data stream propagating through that individual all-optical path. Each of the selected dispersion maps is a substantially singly periodic dispersion map or a substantially doubly periodic dispersion map. For example each dispersion map assigns substantially the same value or one of two values of residual net dispersion per span to the majority of the optical fiber spans of the corresponding all-optical fiber-based path. For example, the first and second dispersion maps may make assignments that are consistent with singly or doubly periodic dispersion maps for more than 80 percent of the optical fiber spans of the corresponding all-optical fiber-based paths or even for 90 percent or more of the optical fiber spans of the corresponding all-optical fiber-based paths.

The method 50 may be more advantageous when the overlap involves a large percentage of the optical fiber spans of one or both of the all-optical fiber-based paths. Such large overlaps may include more than forty percent or even fifty percent or more of the optical fiber spans of one or both paths. In such situations, a conflict between the assignments of RDPSs in the two all-optical fiber-based paths may cause more important effects on BERs in one or both of the all-optical fiber-based paths.

The method 50 includes evaluating a selected quantity for each of the all-optical fiber-based paths (step 54). For each all-optical fiber-based path, the value of the selected quantity is indicative of the distortion that nonlinear optical effects would cause to an optical data stream propagating there through when the corresponding selected dispersion map is implemented therein. For example, the selected quantity may be the total per-channel nonlinear phase, shift, $\phi_{NL}$. A total per-channel nonlinear phase shift, $\phi_{NL}$, of larger magnitude is generally indicative of more distortion due to nonlinear optical effects on the corresponding all-optical fiber-based path. In other embodiments, other physical quantities may be used as the selected quantity of step 54, which measures distortions produced by nonlinear optical effects.

The method 50 includes comparing the values of the selected quantity from the step 54 to determine whether nonlinear optical effects would cause less distortion to an optical data stream propagating through the first all-optical fiber-based path to an optical data stream propagating through the second all-optical fiber-based path when configured with the corresponding selected dispersions maps (step 56). In particular, the two distortions would correspond to the situation where the first all-optical fiber-based path is configured with the first selected dispersion map and where the second all-optical fiber-based path is configured with the second selected dispersion map (step 56). For example, the comparing step 56 may include comparing values of the total per-channel nonlinear phase shifts, $\phi_{NL}$, for each of the all-optical fiber-based path as configured with the corresponding one of the selected dispersion maps of step 52. Then, the all-optical path whose $|\phi_{NL}|$ is smallest is the all-optical fiber-based path in which nonlinear optical effects would cause the least distortion of an optical data stream propagating there through, i.e., least among the two all-optical fiber-based paths.

The method 50 includes replacing the first selected dispersion map with a new dispersion map in response to determining that nonlinear optical effects would cause less distortion to an optical data stream propagating through the first all-optical fiber-based path than to an optical data stream propagating through the second all-optical fiber-based path at comparing step 56 (step 58). In the new dispersion map, the assignments of residual dispersions per span substantially differ from those of the first dispersion map for one or more of the optical fiber spans in the overlap between the first and second all-optical fiber-based paths. Between the new and original first selected dispersion maps, the assignments of residual dispersions per span (RDPSs) for one or more of the optical fiber spans neighboring one or both ends of said overlap may also be substantially adjusted at step 58, but assignments of residual dispersion per span are not substantially adjusted near either end of the first all-optical fiber-based path. In the first selected dispersion map and the new dispersion map, the old and new values of the assigned residual dispersion per span for corresponding optical fiber spans may differ substantially, but still be limited to differing by less than about 500 ps/nm and may be even be limited to differing by less than about 300 ps/nm.

Step 58 typically includes not substantially changing the dispersion map of the second all-optical fiber-based path, in response to determining that nonlinear optical effects would cause less distortion of an optical data stream propagating through the first all-optical path than through the second optical-path at comparing step 56. In addition, at the step 58, the new dispersion map may assign to the optical fiber spans of the overlap substantially the residual dispersions per span that are assigned to those same spans by the originally selected second dispersion.

The method 50 may also include setting the dispersion compensators and/or in-line amplifiers of one or more of the optical fiber spans of the first all-optical path to implement the new dispersion map of step 58 therein (step 60). Step 60 may involve, e.g., constructing the first all-optical fiber-based path to have the new dispersion map or may involve updating the existing first all-optical fiber-based path to have the new dispersion map.

The method 50 may be particularly advantageous in an all-optical network where the selected quantity, which is determined at step 54 indicates that the first all-optical fiber-based path has considerable flexibility in its dispersion map and/or has a substantially limited flexibility in its dispersion map. The dispersion map of the first all-optical fiber-based, path may have considerable flexibility if the total per-channel nonlinear phase shift, $\phi_{NL}$, of the first all-optical fiber-based path is less than 0.9 times its maximum acceptable value. Preferably, the $\phi_{NL}$, of the first all-optical fiber-based path is less than 0.8 times is maximum acceptable value if that path has considerable flexibility in its dispersion map. The dispersion map of the first all-optical fiber-based path may have a substantially limited flexibility if the total per-channel nonlinear phase shift, $\phi_{NL}$, of the first all-optical fiber-based path is greater than 0.1 times its maximum acceptable value. Often, the dispersion map of the first all-optical fibers based optical path has a substantially limited flexibility if its $\phi_{NL}$ is greater than 0.3 times is maximum acceptable value.

FIG. 6 illustrates how method 50 could implement a new dispersion map in one of the all-optical fiber-based paths shown in FIG. 4. The illustrated case corresponds to the situation where both, all-optical fiber-based paths are, e.g., initially substantially singly periodic in a domain around their overlap. FIG. 6 plots the difference of the residual dispersion per span between the new dispersion map and the originally selected dispersion map of the first all-optical fiber-based path in FIG. 4 as might be determined according to the method 50 of FIG. 5. The new dispersion map modifies, e.g., the residual per span dispersions along the overlap segment of the first all-optical fiber-based path so that that those residual per span dispersions correspond to the values assigned to those spans by the dispersion map of the second all-optical fiber-based span. In the overlap, such a change does not substantially increase the amount of distortion that nonlinear optical effects produce on the optical data stream in the second all-optical fiber-based path, i.e., the optical data stream most distorted by such effects. In the overlap, the magnitudes of the changes to residual dispersions per span are always within fixed bounds e.g., bound of ±500 ps/nm or even a bound of ±300 ps/nm. Outside of the overlap, the new dispersion map for the first all-optical fiber-based path appears to be substantially the originally selected substantially singly periodic dispersion map. The method 50 has substantially changed RDPSs of very few or none of the optical fiber spans near the ends of the first all-optical fiber-based path, e.g., the method 50 substantially changed RDPSs of 20 percent or less, 10 percent or less, or none of such optical fiber spans.

From the above disclosure, the figures, and the claims, other embodiments will be apparent to those of skill in the art.

What we claimed is:

1. A method, comprising:
    configuring an all-optical network such that at least eighty percent of optical fiber spans of a portion of a first all-optical path of the network have substantially a first residual dispersion per span and at least eighty percent of optical fiber spans of a remainder of the first all-optical path have residual dispersions per span substantially differing from the first residual dispersion per span; and
    wherein the remainder of the first all-optical path includes an overlap between the first all-optical path and a second all-optical path of the network, the second all-optical path having a plurality of optical fiber spans and a substantially singly periodic dispersion map.

2. The method of claim 1, wherein each of the first and second all-optical paths includes at least eight optical fiber spans.

3. The method of claim 2, wherein at least ninety percent of the optical fiber spans in the remainder of the first all-optical path have a residual dispersion per span that substantially differs from the first residual dispersion per span.

4. The method of claim 3, wherein at least ninety percent of the optical fiber spans of the portion of the first all-optical path have substantially the first residual dispersion per span.

5. The method of claim 2, wherein at least ninety percent of the optical fiber spans of the first all-optical path have residual dispersions per span that differ by less than about 500 picoseconds per nanometer.

6. The method of claim 2, wherein the overlap includes at least forty percent of the optical fiber spans of the first all-optical path.

7. The method of claim 2, wherein at least eighty percent of the optical fiber spans of the remainder of the first all-optical path have substantially a second residual dispersion per span.

8. The method of claim 2, wherein at least eighty percent of the optical fiber spans of the second all-optical path have substantially the second residual dispersion per span.

9. The method of claim 2, wherein at least ninety percent of the optical fiber spans of the remainder of the first all-optical path and at least ninety percent of the optical fiber spans of the second all-optical fiber-based path have substantially the second residual dispersion per span.

10. The method of claim 9, wherein the overlap includes at least forty percent of the optical fiber spans of the first and second all-optical paths.

* * * * *